United States Patent
Kinzel

(10) Patent No.: US 7,360,827 B2
(45) Date of Patent: Apr. 22, 2008

(54) AUTOMOBILE SUNROOF DEFLECTOR ASSEMBLY

(75) Inventor: Stanley Grant Kinzel, Calgary (CA)

(73) Assignee: Focus Auto Design Inc., Calgary (CA)

( * ) Notice: Subject to any disclaimer, the term of this patent is extended or adjusted under 35 U.S.C. 154(b) by 349 days.

(21) Appl. No.: 10/520,707

(22) PCT Filed: Jul. 8, 2003

(86) PCT No.: PCT/CA03/01028

§ 371 (c)(1), (2), (4) Date: Jan. 10, 2005

(87) PCT Pub. No.: WO2004/005062

PCT Pub. Date: Jan. 15, 2004

(65) Prior Publication Data

US 2006/0255629 A1    Nov. 16, 2006

(30) Foreign Application Priority Data

Jul. 8, 2002    (CA) .................................... 2392743

(51) Int. Cl.
*B60J 7/22* (2006.01)

(52) U.S. Cl. ..................................... 296/217

(58) Field of Classification Search .......... 296/180.1, 296/217, 91, 95.1, 152, 154
See application file for complete search history.

(56) References Cited

U.S. PATENT DOCUMENTS

| 4,171,846 | A | * | 10/1979 | Isleif et al. ................. 296/217 |
| 4,750,782 | A | * | 6/1988 | Turner ........................ 296/217 |
| 4,934,754 | A | * | 6/1990 | Cioffi ......................... 296/217 |
| 5,346,274 | A | | 9/1994 | Syamal et al. |
| 5,639,142 | A | * | 6/1997 | Willey ........................ 296/217 |
| 5,782,527 | A | * | 7/1998 | Willey ........................ 296/217 |

FOREIGN PATENT DOCUMENTS

| DE | 2154707 |   | * | 11/1971 |
| DE | 3613738 | C | * | 2/1992 |
| DE | 3400992 | A1 |   | 7/1994 |
| FR | 1131218 |   | * | 9/1955 |

* cited by examiner

Primary Examiner—Dennis Pedder
Assistant Examiner—Melissa Black
(74) Attorney, Agent, or Firm—Thomas E. Malyszko

(57) ABSTRACT

A deflector assembly for an automobile sunroof (60) has an elongate acrylic visor (40) for, deflecting air from the sunroof and, a pedestal (150*a*) mountable to each end of the visor to form the deflector assembly. Each of the pedestals is secured onto the automobile, such as with a clip (155) and fastener (156) arrangement, to removably retain the visor adjacent the sunroof. Gaskets (48, 49) are provided as a buffer between the deflector assembly and the automobile's roof, and an inert material (48*a*) is placed adjacent the visor to avoid adverse reaction with the gasket material (48*b*).

15 Claims, 5 Drawing Sheets

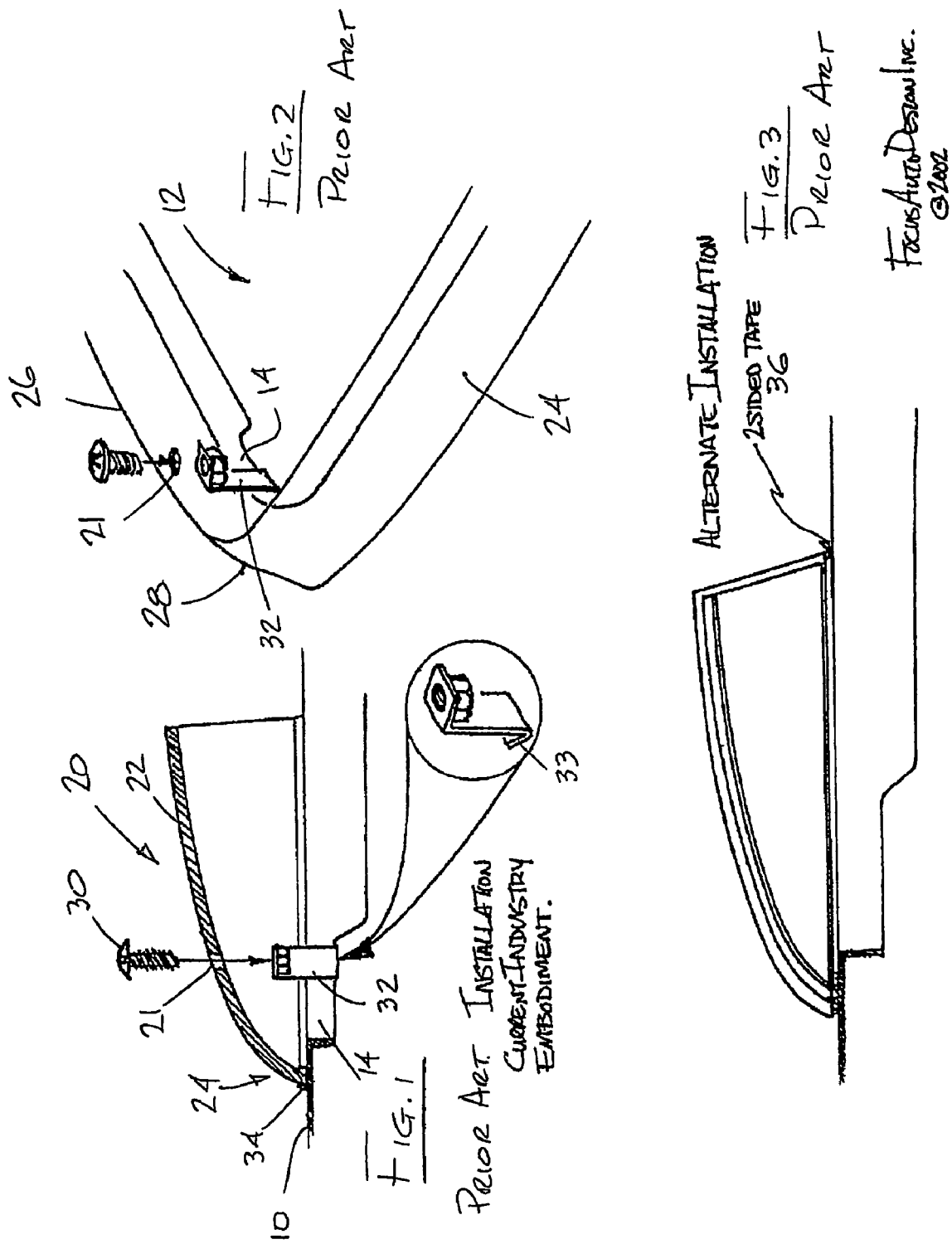

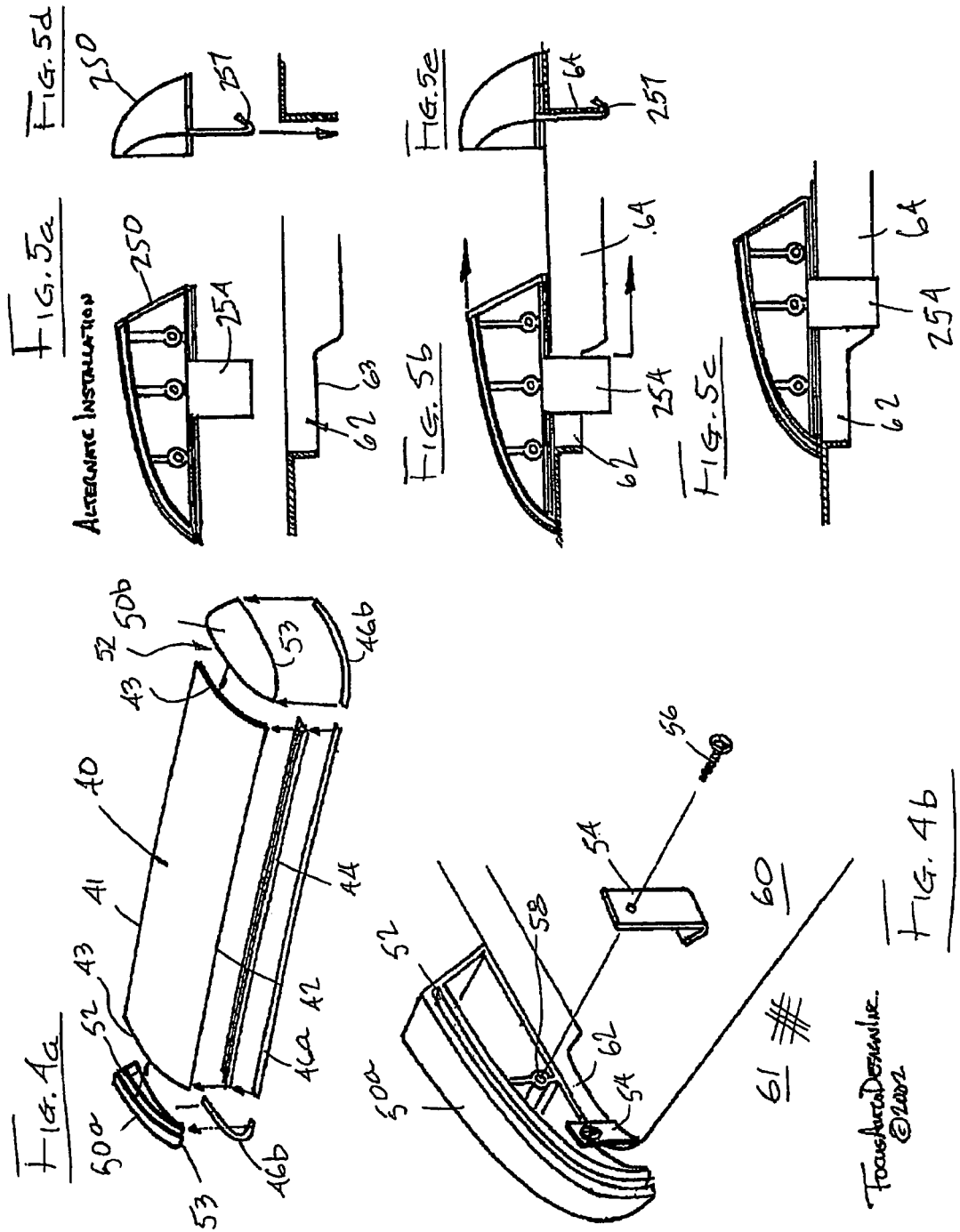

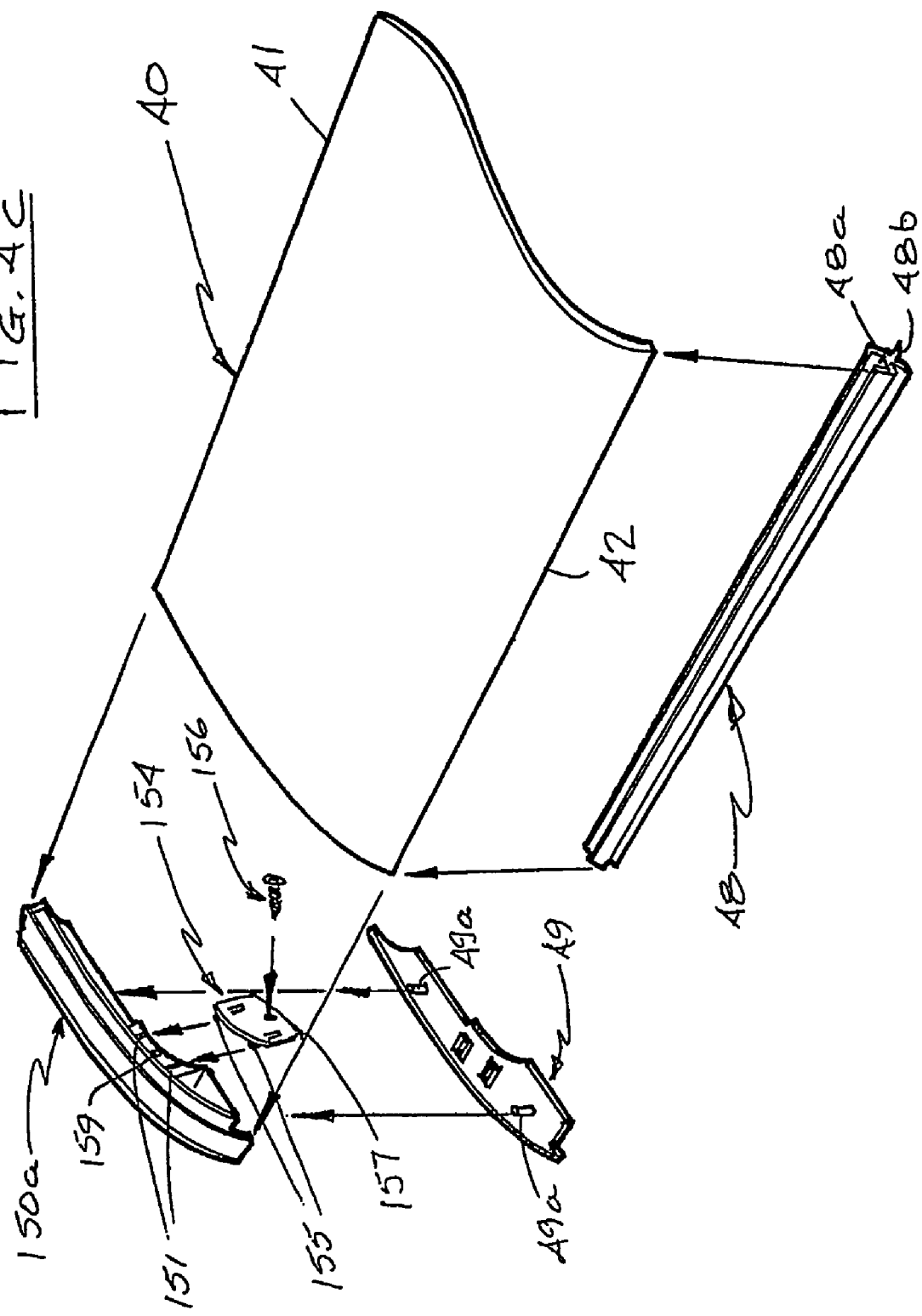

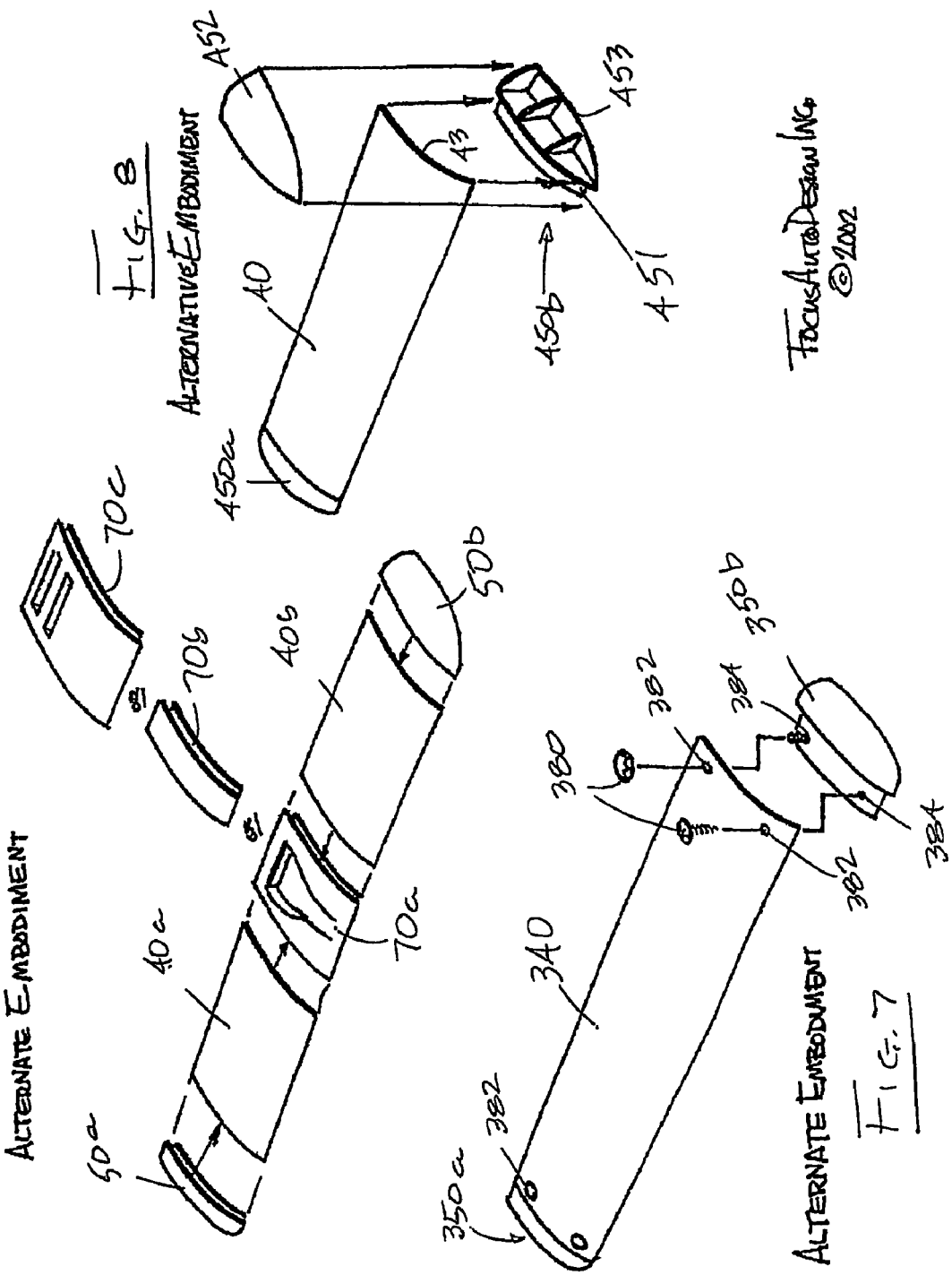

AUTOMOBILE SUNROOF DEFLECTOR ASSEMBLY

FIELD OF THE INVENTION

The present invention relates to air deflectors in general, and in particular to air deflectors for use with automobile sunroofs.

BACKGROUND OF THE INVENTION

FIGS. 1-3 show currently popular forms of automobile sunroof air, or wind, deflectors. In the version shown in FIGS. 1 and 2, the deflector has a visor element 20 vacuum formed from a single sheet of acrylic. The visor has: a gently sloping, generally planar top portion 22 that extends over a front part of the sunroof opening 12 on the automobile's roof 10; a front portion or edge 24 for location on the roof immediately in front of the opening, and which extends longitudinally slightly beyond the width of the opening 12; and, upstanding side portions 26 extending transversely to the rear of the front portion 24 closing each end of the visor. The top, front and side portions all meet at an elbow or corner 28 of the visor. The visor is retained on the roof by a screw 30 and bracket 32 arrangement near each corner 28. The bracket has a hook 33 at one end for engaging beneath a flange 14 along the perimeter of the opening, and the screw 30 extends through a hole 21 near the corner of the visor to engage the bracket and thereby clamp the visor to the roof. A gasket 34 is typically adhered along the visor's perimeter with the aim of preventing damage to the roof's painted exterior surface.

In an alternate arrangement shown in FIG. 3 a two-sided tape 36 may be used along the perimeter of the visor for mounting to the roof, either with or without the previously described screw and bracket arrangement.

The above prior art arrangements suffer from several disadvantages:
the adhesives for the gaskets may react with the acrylic deflectors and result in "crazing" and/or discoloration of the visor;
plasticizers in the flexible gaskets also adversely chemically attack the acrylic material of the deflectors;
the exposed fasteners result is visual clutter and pose corrosion problems;
the corners of the visor are put under tension by the pull of the brackets to ensure that the gasket is compressed on the roof, but this causes stress concentrations and possible cracks at the holes, and predisposes the visor to material fatigue;
temperature fluctuations cause material stresses which result in buckling and warping of the visor;
the vacuum forming process for the visor is quite complicated, expensive and delicate due to the difficulty in forming the corners 28, and imparts undue localized stresses at such corners; and,
the prior art products are labour intensive to manufacture (e.g. the edge finishing) and to install because the nuts are difficult to reach and the location of the screws lead to a large percentage of discarded product when visors are scratched during screw installation.

What is therefore desired is a novel air deflector arrangement which overcomes the limitations and disadvantages of the existing products.

SUMMARY OF THE PRESENT INVENTION

In one aspect the invention provides a deflector assembly for an automobile sunroof comprising:

a generally elongate visor member for deflecting air having opposed end portions;

a pedestal member mountable to each of said end portions to form said deflector assembly; and, means for securing each of said pedestals onto said automobile to removably retain said visor member adjacent said sunroof.

BRIEF DESCRIPTION OF THE DRAWING FIGURES

Embodiments of the invention will now be described, by way of example only, with reference to the accompanying drawings, wherein:

FIGS. 1 to 3 show prior art air deflectors;

FIG. 4a is an exploded perspective view of a automobile sunroof deflector assembly according to a first embodiment of the present invention;

FIG. 4b is a detailed perspective view showing the pedestal of FIG. 4a mounted to an automobile roof adjacent the sunroof opening;

FIG. 4c shows a preferred variant of the FIG. 4a embodiment in a more detailed exploded perspective view of the left side;

FIGS. 5a to 5e are cross-section side and end views of an alternate embodiment of the mounting system of the present invention;

FIG. 6 to 8 are exploded perspective views of alternate embodiments of the automobile sunroof deflector assembly of the present invention; and, FIG. 9a is a front perspective view from above

DESCRIPTION OF EMBODIMENTS OF THE INVENTION

Figure 9A:
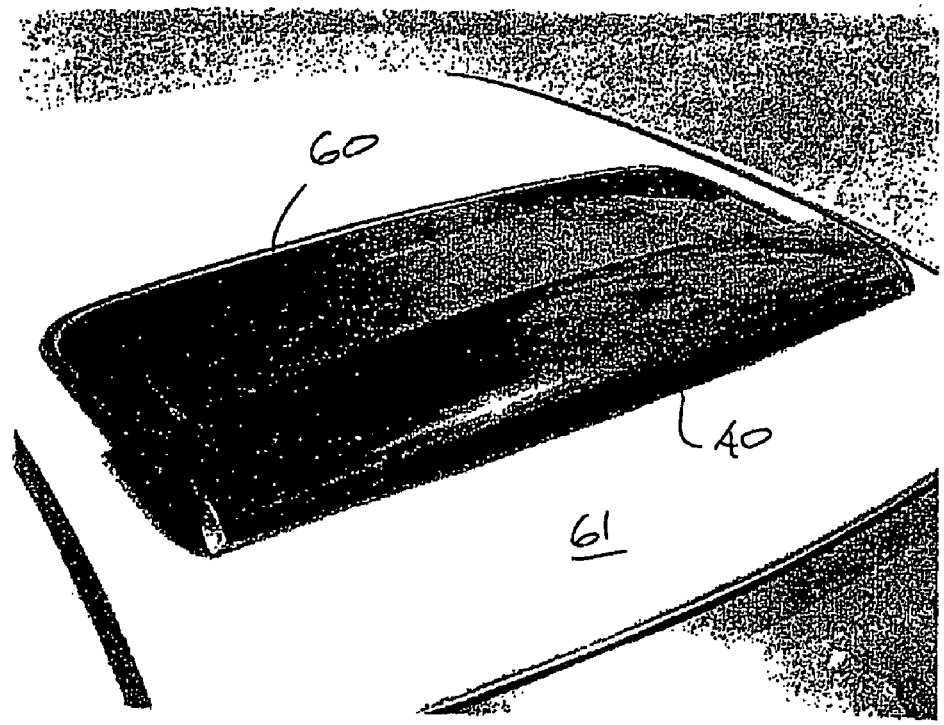
FIG. 9b is a side view of the sunroof deflector assembly of the present invention mounted to the front end of an automobile's sunroof.

It is noted that the terms "front" or "forward", "rear" or "backward", "upper", "lower" and the like may be used for identifying certain features of the present invention relative to the vehicle when placed on the roof of the vehicle. The use of these terms is not intended to limit the invention's use or orientation. Further, when describing the invention, all terms not defined herein have their common art-recognized meaning.

Referring first to FIGS. 4a and 4b, a first embodiment of the present invention has a central or main visor 40, also referred to herein as an air deflector "blade", made of a sheet of acrylic or other suitable material. The blade is generally planar but bowed slightly downwardly toward the front or leading longitudinal edge 42, and may be bowed upwardly along some or all of the back edge 41 (as shown more clearly in the FIG. 4c embodiment) as desired for enhanced air deflection. The blade 40 omits the problematic corners of the prior art visors as discussed earlier. Rather, the present air deflector arrangement provides first and second, or left and right (as viewed in FIG. 4a), end pieces or "pedestals" 50a and 50b, respectively, which are adapted to receive respective lateral edges 43 of the blade into a complimentary shaped elongate slot 52 in each pedestal. The pedestals are formed of plastic or other suitable material (preferably an opaque material) by a relatively simple injection molding or like suitable inexpensive process. The visible surface of the pedestals may be made into virtually any desired shape for visual appeal.

A barrier strip 44 of inert material (such as a suitable rigid PVC extrusion) is placed along the leading edge 42 of the blade prior to placing relatively flexible gaskets 46a and 46b along the blade's leading edge (underneath the barrier strip) and the lower roof-engaging edges 53 of the pedestals, respectively. Thus, the sensitive acrylic of the blade remains out of contact with the harmful elements of the gaskets, whereas the plastic material of the pedestals is not impacted by the gaskets. Hence, the gaskets may be made of an industry standard material for automotive door gaskets, such as SANTOPRENE.

Once the deflector is assembled by mounting the pedestals onto the ends of the blade, and the barrier strip and gaskets are mounted underneath the blade and pedestals, the deflector assembly is then installed on the vehicle's roof 61 adjacent the front end of the sunroof opening 60. Mounting of the assembly to the roof is achieved by snugly clipping one or more J-shaped brackets 54 under a perimeter flange 62 of the opening, and attaching the other end of the bracket to a corresponding end piece 50 via aperture 58 and fastener 56. Once both pedestals 50a and 50b are secured to the sunroof opening in this manner, the mounting is complete. It will be appreciated that an alternate, but not preferred, mounting sequence would be to first fix one pedestal to the roof, then slide one edge of the blade into the fixed pedestal, and then, with the other pedestal registered with the other edge of the blade, complete the assembly by fixing the latter pedestal to the roof.

An advantage of such arrangement is the relative ease of mounting the brackets 54 and access to the screws with a screw driver. Further, should a screw driver slip, it will likely impact the pedestal and not the visor, thus avoiding replacement of the deflector assembly. Another advantage is that there is no exposed screw exterior of the deflector, which is visually desirable and allows for use of relatively less expensive screws. Yet another advantage of such arrangement is that the slots 52 in the pedestals allow for the visor to freely expand (as there should be some give of the visor edge in the longitudinal and/or transverse directions within the pedestal slot) due to temperature effects, thus avoiding unnecessary stresses in the visor that lead to warping and buckling.

FIG. 4c shows a preferred variant of the above first embodiment. For each of the variants and embodiments disclosed herein the same reference numerals are used for the same or substantially similar components. In the instant variant, the barrier strip 44 and gasket 46a are in essence combined into one integral blade gasket 48 having an upper channel member 48a for mounting along the length of the blade's leading edge 42, and a lower portion 48b with splayed legs for abutting the roofs painted exterior surface ahead of the sunroof opening. The material of the upper channel 48a (which is identical or similar to that of the earlier-noted barrier strip 44) is co-extruded with the material of the lower portion 48b (which is identical or similar to that of the earlier-noted gasket 46a), and thus provides an easier-to-handle one piece gasket of reduced size which maintains sealing contact with the roof and is chemically compatible with the visor. It is noted that the pedestal gaskets 49 are keyed at 49a to provide a secure and correct alignment with the base of pedestal 150a.

Another significant feature in FIG. 4c is the mounting bracket 154 to be used in place of the bracket 54. The bracket 154 has two spaced dowels or barbs 155 protruding from a back face thereof for engaging corresponding vertically oriented grooves 151 on an inner surface of the pedestal 150a wherein each groove has a plurality of teeth (much like the teeth on a gear) along a lower portion thereof. The lower j-shaped end of the bracket 154 forms a lip 157 for engaging the perimeter flange 62 of the sunroof opening. The bracket 154 is preferably made of a plastic or other non-metallic material to avoid metal-on-metal contact with the roof. In use, the dowels 155 are aligned with the lower end of corresponding pedestal grooves 151 and are pushed thereinto until the bracket 154 snaps into the pedestal. A user should stop pushing after a first audible "click" sound (made by the barbs passing over the teeth) to leave the bracket at maximum extension below the pedestal to facilitate installation onto the sunroof opening. Once the other components of the deflector are assembled together in a similar manner as noted earlier and positioned on the roof adjacent the front edge of the open sunroof, the user should hold the pedestal 150a with one hand (preferably from inside the vehicle), while using the other hand to slide the bracket 154 further (i.e. upward) along the grooves 151 until the lip 157 is fully seated onto the edge of the sunroof's flange 62. The fastener 155 is then inserted through a hole in the bracket and to engage a corresponding oblong hole 159 in the pedestal, thus fixing the pedestal to the roof. The inner periphery of the hole 159 is inwardly tapered to help guide the fastener 156 into proper engagement with the pedestal.

In another embodiment of the mounting system of the present invention shown in FIGS. 5a to 5e, a clip 254 has a lower hook portion 257 and an upper portion fixed to or formed integrally with an interior portion of the pedestal 250 to avoid the need for a fastener as in the above embodiment. The pedestal is mounted to the roof by simply lowering the pedestal onto the roof adjacent a location where the perimeter flange 62 has an end cut 63 (FIG. 5b), and then sliding the pedestal rearwardly until the hook portion 257 slides onto and engages with a deeper portion 64 of the flange (FIGS. 5c & 5e). Thus use of tools such as screwdrivers is avoided, minimizing installation time and resultant labour costs in car assembly plants or the like.

Further alternate embodiments of the deflector assembly are show in FIGS. 6 to 8. In the FIG. 6 embodiment the visor may be split into two (or more) portions 40a and 40b and a plastic middle piece 70a is inserted therebetween for visual appeal or other reasons. Various styles an widths of middle pieces (70b or 70c for example) may be used. This arrangement allowing for the mounting of the assembly to different sized sunroof openings without changing the visor pieces 40a, 40b.

In the FIG. 7 embodiment the visor 340 may be mounted to the pedestals 350a and 350b using an exterior screw arrangement as shown, namely by passing one or more screws 380 through holes 382 near the edges of the visor and engaging aligned apertures 384 in the pedestal. To avoid the use of such screws, the FIG. 8 embodiment provides a pedestal (for instance pedestal 450b) with a base 453 having a recessed lip 451 for receiving a transverse edge 43 of the visor 40. The visor is held in place by a cap 452 which snaps onto the base 453 or is fixed thereto by fasteners or equivalent means.

Figure 9B:
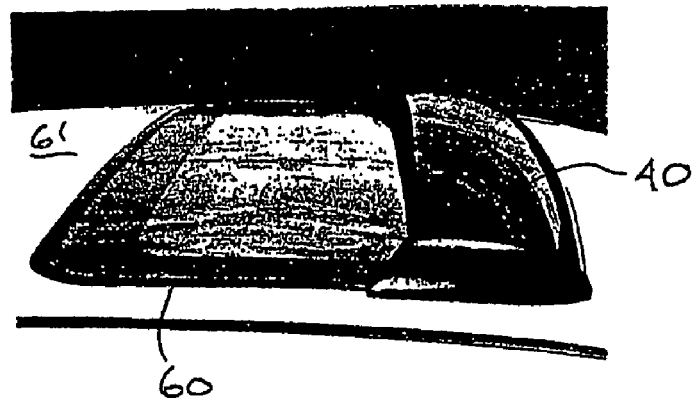

FIGS. 9a and 9b show the preferred embodiment of the assembly of the present invention mounted on a roof 61 of a vehicle adjacent its sunroof 60.

Some of the many advantages or the present invention may now be appreciated:
no post-forming trimming should be needed due to simpler forming of visor, and so all edge work is done prior to forming;
only simple tooling should be needed to use and produce the deflector;

hardware and pedestal (i.e. end piece) assembly is provided for universal fit onto vehicles;

adhesives should not be required to hold the components together;

contact of the plasticized flexible gasket with the visor is eliminated;

components allow for smaller packaging, and thus should provide cost saving and environmental benefits;

holes in the visor should be avoided (except for FIG. 7 embodiment);

tension in the visor should be avoided due to simple shape and fit with end pieces;

the deflector should allow easy assembly and installation;

pedestals may be designed to complement vehicle roof detailing and may be modified to suit particular requirements; and, a variety of material choices is available, particularly for pedestals.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below. For instance, in a yet further variant, the gaskets may be integrally formed with the visor and/or the pedestals, or the grooves may be provided along the lower edges of the visor and/or pedestals for receiving a gasket-like member therein. Further, the visor and/or pedestals may be formed of suitable material which does not damage the automobile's roof, and hence eliminates the need for gaskets altogether.

We claim:

1. An air deflector assembly for a sunroof opening in an automobile roof comprising:
   a generally elongate central visor having opposed lateral edges;
   a pedestal mountable to each of said lateral edges to support the visor on the roof;
   means for securing each pedestal to said roof to removably retain said pedestals and visor adjacent said sunroof opening; and
   flexible gaskets for location beneath each of said pedestals and a leading edge of said visor, wherein said gasket for said visor comprises an upper portion of inert material mountable onto said leading edge and a second lower portion for abutting said automobile roof.

2. The air deflector of claim 1 wherein each pedestal includes an elongate slot for slidably receiving a respective edge of said visor.

3. The air deflector of claim 2 wherein said slot includes means for reducing temperature induced stresses in said visor comprising suitably dimensioning said slot to accommodate expansion and contraction of the visor edge therewith in.

4. The air deflector of claim 1 wherein said pedestal comprises a base member having a recessed lip portion for receiving said lateral edge thereon, and means for holding said lateral edge on base member.

5. The air deflector of claim 4 wherein said holding means comprises at least two fasteners for fixing said visor to said base.

6. The air deflector of claim 4 wherein said holding means comprises a cap engageable with said base member for sandwiching a visor lateral edge therebetween.

7. The air deflector of claim 1 wherein said upper and lower portions of said gasket are co-extruded, said upper portion defines a channel for receiving said leading edge, and said lower portion forms at least two flexible splayed legs for abutting said roof.

8. The air deflector of claim 1 wherein said gasket is integrally formed with one or more of said visor and said pedestals.

9. The air deflector of claim 1 wherein said visor comprises at least first and second distinct visor portions, and a middle member of suitable size mountable intermediate said visor portions for providing an interconnected visor arrangement of desired dimension for said sunroof opening.

10. The air deflector of claim 1 wherein said securing means comprises an elongate clip having an upper portion connectable to said pedestal and a lower hooked portion for engaging said sunroof opening to retain said pedestal on said roof.

11. The air deflector of claim 10 wherein said clip is of suitable length to allow said lower hooked portion to be slidingly engaged with a perimeter flange of said sunroof opening to retain said pedestal on said roof.

12. An air deflector assembly for a sunroof opening in an automobile roof comprising:
    a generally elongate central visor having opposed lateral edges;
    a pedestal mountable to each of said lateral edges to support the visor on the roof;
    means for securing each pedestal to said roof to removably retain said pedestals and visor adjacent said sunroof opening; and
    flexible gaskets for location beneath each of said pedestals and a leading edge of said visor, wherein a barrier strip of inert material is located intermediate said visor leading edge and respective gasket.

13. An air deflector assembly for a sunroof opening in an automobile roof comprising:
    a generally elongate central visor having opposed lateral edges;
    a pedestal mountable to each of said lateral edges to support the visor on the roof; and
    means for securing each pedestal to said roof to removably retain said pedestals and visor adjacent said sunroof opening, wherein said securing means includes a bracket having a lower hooked portion for engaging said sunroof opening, and a barbed portion above said hooked portion for slidably mating in a plurality of positions with a grooved portion on said pedestal which serves to provide a universal fit with said sunroof opening.

14. The air deflector of claim 13 wherein said grooved portion comprises a generally elongate groove having a plurality of teeth therealong, and said barbed portion comprises a barb protruding from said bracket for slidably registering with said teeth in said groove.

15. The air deflector of claim 14 wherein at least two barbs are provided on said bracket in a spaced relationship for engaging respective grooves on said pedestal, and said securing means further includes a fastener for securing said bracket in a desired position to said pedestal to retain said pedestal on said roof.

* * * * *